(12) United States Patent
Hart et al.

(10) Patent No.: US 8,491,437 B2
(45) Date of Patent: Jul. 23, 2013

(54) MULTI-SPEED TRANSMISSION HAVING THREE PLANETARY GEAR SETS

(75) Inventors: James M. Hart, Belleville, MI (US);
James B. Borgerson, Clarkston, MI (US); Andrew W. Phillips, Rochester, MI (US); Clinton E. Carey, Highland, MI (US); Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 317 days.

(21) Appl. No.: 12/841,683

(22) Filed: Jul. 22, 2010

(65) Prior Publication Data
US 2011/0034290 A1    Feb. 10, 2011

Related U.S. Application Data (60) Provisional application No. 61/231,573, filed on Aug. 5, 2009.

(51) Int. Cl.
*F16H 3/64* (2006.01)

(52) U.S. Cl.
USPC .......................................... 475/276; 475/282

(58) Field of Classification Search
USPC .......................... 475/276, 275, 286, 317, 330
See application file for complete search history.

(56) References Cited

U.S. PATENT DOCUMENTS

| | | | |
|---|---|---|---|
| 7,833,123 B2* | 11/2010 | Hiramatsu | 475/276 |
| 2003/0162626 A1* | 8/2003 | Raghavan et al. | 475/282 |
| 2008/0020890 A1* | 1/2008 | Shim | 475/276 |
| 2008/0261764 A1* | 10/2008 | Hart et al. | 475/276 |
| 2011/0015029 A1* | 1/2011 | Phillips et al. | 475/275 |
| 2011/0034289 A1* | 2/2011 | Hart et al. | 475/275 |

* cited by examiner

*Primary Examiner* — Justin Holmes
*Assistant Examiner* — Stacey Fluhart (57) ABSTRACT

A transmission is provided having an input member, an output member, three planetary gear sets, a plurality of coupling members and a plurality of torque transmitting devices. Each of the planetary gear sets includes first, second and third members. The torque transmitting devices include clutches and brakes.

8 Claims, 5 Drawing Sheets

| GEAR STATE | GEAR RATIO | RATIO STEP | TORQUE TRANSMITTING ELEMENTS | | | |
|---|---|---|---|---|---|---|
| | | | 32 | 34 | 26 | 28 |
| REV | -7.750 | | | X | X | |
| N | | -1.72 | | O | | |
| 1ST | 4.500 | | | X | | X |
| 2ND | 3.100 | 1.45 | X | X | | |
| 3RD | 1.955 | 1.59 | X | | | X |
| 4TH | 1.445 | 1.35 | X | | X | |
| 5TH | 1.000 | 1.44 | | | X | X |

X = ON - ENGAGED CARRYING TORQUE
O = ON - ENGAGED NOT CARRYING TORQUE
G = ON - GARAGE SHIFT ELEMENT ON AND CARRYING TORQUE

| GEAR STATE | GEAR RATIO | RATIO STEP | TORQUE TRANSMITTING ELEMENTS | | | |
|---|---|---|---|---|---|---|
| | | | 134 | 132 | 126 | 128 |
| REV | -3.988 | | | X | X | |
| N | | -0.86 | | O | | |
| 1ST | 4.627 | | | X | | X |
| 2ND | 2.900 | 1.60 | X | X | | |
| 3RD | 1.782 | 1.63 | X | | | X |
| 4TH | 1.369 | 1.30 | X | | X | |
| 5TH | 1.000 | 1.37 | | | X | X |

X = ON - ENGAGED CARRYING TORQUE
O = ON - ENGAGED NOT CARRYING TORQUE
G = ON - GARAGE SHIFT ELEMENT ON AND CARRYING TORQUE

| GEAR STATE | GEAR RATIO | RATIO STEP | TORQUE TRANSMITTING ELEMENTS ||||
|---|---|---|---|---|---|---|
| | | | 234 | 232 | 228 | 226 |
| REV | -3.715 | | | X | X | |
| N | | -0.82 | | | | |
| 1ST | 4.512 | | | X | | X |
| 2ND | 2.767 | 1.63 | X | X | | |
| 3RD | 1.621 | 1.71 | X | | | X |
| 4TH | 1.290 | 1.26 | X | | X | |
| 5TH | 1.000 | 1.29 | | | X | X |

X = ON - ENGAGED CARRYING TORQUE
O = ON - ENGAGED NOT CARRYING TORQUE
G = ON - GARAGE SHIFT ELEMENT ON AND CARRYING TORQUE

FIG. 9

MULTI-SPEED TRANSMISSION HAVING THREE PLANETARY GEAR SETS

CROSS-REFERENCE TO RELATED APPLICATIONS

This application claims priority to U.S. Provisional Application No. 61/231,573, filed on Aug. 5, 2009, which is hereby incorporated in its entirety herein by reference.

FIELD

The invention relates generally to a multiple speed transmission having a plurality of planetary gear sets and a plurality of torque transmitting devices and more particularly to a transmission having five or more speeds, three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, a plurality of coupling members and a plurality of torque transmitting devices. Each of the planetary gear sets includes first, second and third members. The torque transmitting devices are for example clutches and brakes.

In another embodiment of the present invention a transmission is provided having a first, a second and a third planetary gear set each having a sun gear, a carrier member and a ring gear. Further, an input member is continuously connected for common rotation with the sun gear of the third planetary gear set. An output member is continuously connected for common rotation with the carrier member of the third planetary gear set. A first interconnecting member continuously interconnects the carrier member of the first planetary gear set with the ring gear of the second planetary gear set. A second interconnecting member continuously interconnects the ring gear of the first planetary gear set with the carrier member of the second planetary gear set. A third interconnecting member continuously interconnects the ring gear of the second planetary gear set with the ring gear of the third planetary gear set. A first torque transmitting mechanism is selectively engageable to interconnect the sun gear of the second planetary gear set with the sun gear of the third planetary gear set. A second torque transmitting mechanism is selectively engageable to interconnect the sun gear of the second planetary gear set with the carrier member of the third planetary gear set. A third torque transmitting mechanism is selectively engageable to interconnect the sun gear of the first planetary gear set with the stationary member. A fourth torque transmitting mechanism is selectively engageable to interconnect the ring gear of the first planetary gear set and the carrier member of the second planetary gear set with the stationary member. The torque transmitting mechanisms are selectively engageable in combinations of at least two to establish at least five forward speed ratios and at least one reverse speed ratio between the input member and the output member.

In yet another embodiment of the present invention, a transmission is provided having a first, a second and a third planetary gear set each having a sun gear, a carrier member and a ring gear. Further, an input member is continuously connected for common rotation with the sun gear of the third planetary gear set. An output member is continuously connected for common rotation with the carrier member of the third planetary gear. Moreover, a first interconnecting member is continuously interconnecting the carrier member of the first planetary gear set with the carrier member of the second planetary gear set. A second interconnecting member continuously interconnects the ring gear of the first planetary gear set with the ring gear of the second planetary gear set. A third interconnecting member continuously interconnects the carrier member of the second planetary gear set with the ring gear of the third planetary gear set. A first torque transmitting mechanism is selectively engageable to interconnect the sun gear of the third planetary gear set and the input member with the sun gear of the second planetary gear set. A second torque transmitting mechanism is selectively engageable to interconnect the sun gear of the second planetary gear set with the carrier member of the third planetary gear set. A third torque transmitting mechanism is selectively engageable to interconnect the ring gear of the first planetary gear set with the stationary member. A fourth torque transmitting mechanism is selectively engageable to interconnect the sun gear of the first planetary gear set with the stationary member. The torque transmitting mechanisms are selectively engageable in combinations of at least two to establish at least five forward speed ratios and at least one reverse speed ratio between the input member and the output member.

In another embodiment of the present invention, a transmission is provided having a first, a second and a third planetary gear set each having a sun gear, a carrier member and a ring gear. Further, an input member is continuously connected for common rotation with the sun gear of the third planetary gear set. An output member is continuously connected for common rotation with the carrier member of the third planetary gear set. A first interconnecting member continuously interconnects the carrier member of the first planetary gear set with the carrier member of the second planetary gear set. A second interconnecting member continuously interconnects the ring gear of the first planetary gear set with the sun gear of the second planetary gear set. A third interconnecting member continuously interconnects the carrier member of the second planetary gear set with the ring gear of the third planetary gear set. A first torque transmitting mechanism is selectively engageable to interconnect the sun gear of the second planetary gear set with the carrier member of the third planetary gear set. A second torque transmitting mechanism is selectively engageable to interconnect the sun gear of the second planetary gear set with the sun gear of the third planetary gear set. A third torque transmitting mechanism is selectively engageable to interconnect the ring gear of the second planetary gear set with the stationary member. A fourth torque transmitting mechanism is selectively engageable to interconnect the sun gear of the first planetary gear set with the stationary member. The torque transmitting mechanisms are selectively engageable in combinations of at least two to establish at least five forward speed ratios and at least one reverse speed ratio between the input member and the output member.

Further feature, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that the embodiments of the five speed automatic transmission of the present invention have an arrangement of permanent mechanical connections between the elements of the three planetary gear sets. A second component or element of a first planetary gear set is permanently coupled to a first component or element of the second planetary gear set. A third component or element of the first planetary gear set is permanently coupled to second component or element of the second planetary gear set. A first component or element of a third planetary gear set is permanently coupled to second component or element of the first planetary gear and to the first component or element of the second planetary gear set Referring now to FIG. 1, an embodiment of a five speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16 and a third planetary gear set 18 and an output shaft or member 22. In the lever diagram of FIG. 1, the levers for the first planetary gear set 14 and the second planetary gear set 16 have been combined into a single four node lever 14,16 having: a first node 14A, a second node 16A,14B, a third node 14C, 16B and a fourth node 16C. The third planetary gear set 18 has three nodes: a first node 18A, a second node 18B and a third node 18C. The input member 12 is continuously coupled to the third node 18C of the third planetary gear set 18. The output member 22 is coupled to the second node 18B of the third planetary gear set 18. The second node 14B of the first planetary gear set 14 is coupled to the first node 16A of the second planetary gear set 16. The third node 14C of the first planetary gear set 14 is coupled to second node 16B of the second planetary gear set 16. The first node 18A of the third planetary gear set 18 is coupled to second node 16A,14B.

Figure 1:
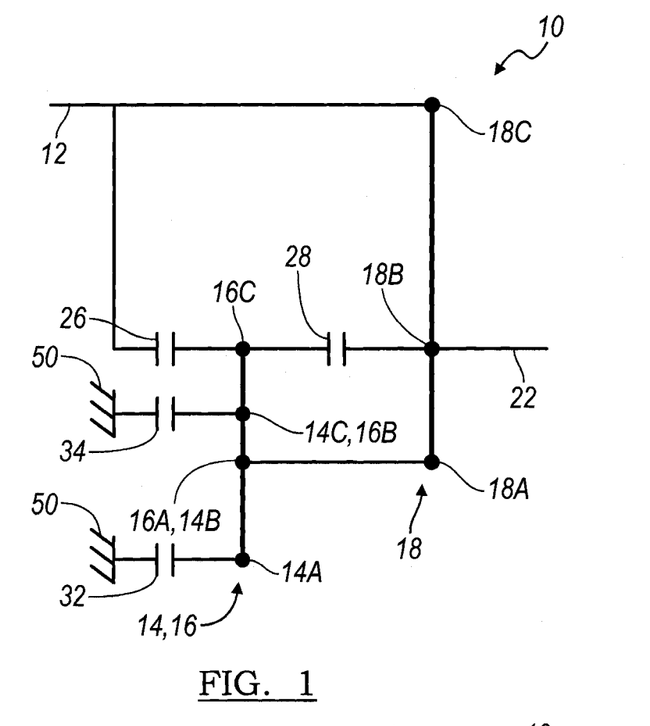
FIG. 1 is a lever diagram of an embodiment of a five speed transmission according to the present invention.

A first clutch 26 selectively connects the third node 16C of the second planetary gear set 16 with the third node 18C of the third planetary gear set 18 and with the input member or shaft 12. A second clutch 28 selectively connects the third node 16C of the second planetary gear set 16 with the second node 18B of the third planetary gear set 18. A first brake 32 selectively connects the first node 14A of the first planetary gear set 14 with a stationary member or transmission housing 50. A second brake 34 selectively connects the second node 14C, 16B with a stationary member or transmission housing 50.

Figure 2:
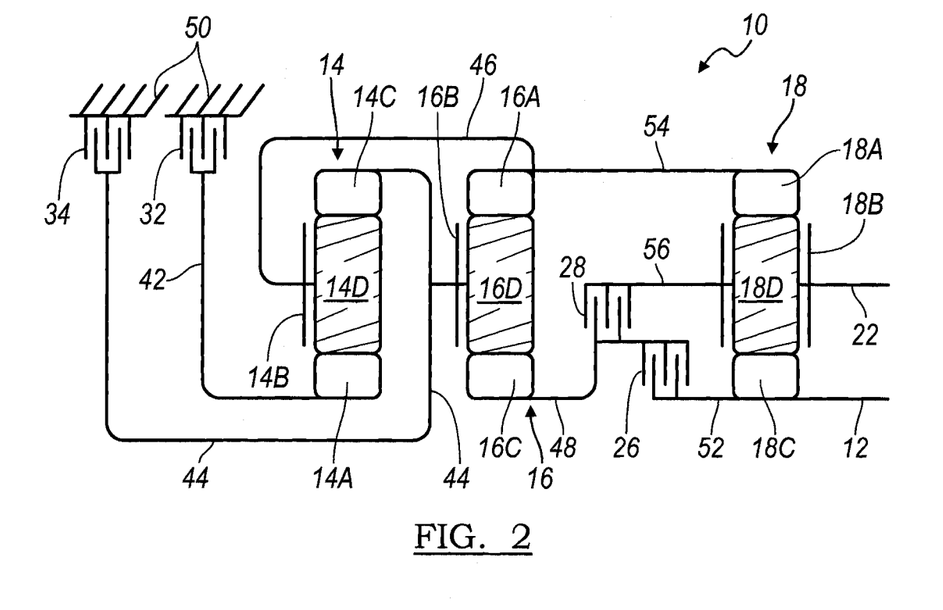
FIG. 2 is a diagrammatic illustration of an embodiment of a five speed transmission according to the present invention.

Referring now to FIG. 2, a stick diagram presents a schematic layout of the embodiment of the five speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42. The ring gear member 14C is connected for common rotation with a second shaft or interconnecting member 44. The planet carrier member 14B is connected for common rotation with and a third shaft or interconnecting member 46. The planet gears 14D are each configured to intermesh with both the sun gear member 14A and the ring gear member 14C.

The planetary gear set 16 includes a sun gear member 16C, a ring gear member 16A and a planet gear carrier member 16B that rotatably supports a set of planet gears 16D (only one of which is shown). The sun gear member 16C is connected for common rotation with a fourth shaft or interconnecting member 48. The ring gear member 16A is connected for common rotation with the third shaft or interconnecting member 46 and the sixth shaft or interconnecting member 54. The planet carrier member 16B is connected for common rotation with a second shaft or interconnecting member 44. The planet gears 16D are each configured to intermesh with both the sun gear member 16C and the ring gear member 16A.

The planetary gear set 18 includes a sun gear member 18C, a ring gear member 18A and a planet gear carrier member 18B that rotatably supports a set of planet gears 18D (only one of which is shown). The sun gear member 18C is connected for common rotation with a fifth shaft or interconnecting member 52 and the input shaft or member 12. The ring gear member 18A is connected for common rotation with the sixth shaft or interconnecting member 54. The planet carrier member 18B is connected for common rotation with a seventh shaft or interconnecting member 56 and with the output shaft or member 22. The planet gears 18D are each configured to intermesh with both the sun gear member 18C and the ring gear member 18A.

The input shaft or member 12 is continuously connected to an engine (not shown) or to a turbine of a torque converter (not shown). The output shaft or member 22 is continuously connected with the final drive unit or transfer case (not shown).

The torque-transmitting mechanisms or clutches 26, 28 and first brake 32 and second brake 34 allow for selective interconnection of the shafts or interconnecting members, members of the planetary gear sets and the housing. For example, the first clutch 26 is selectively engageable to connect the fourth shaft or interconnecting member 48 with the fifth shaft or interconnecting member 52. The second clutch 28 is selectively engageable to connect the fourth shaft or interconnecting member 48 with the seventh shaft or interconnecting member 56. The first brake 32 is selectively engageable to connect the first shaft or interconnecting member 42 with the stationary element or the transmission housing 50 in order to restrict the member 42 from rotating relative to the transmission housing 50. The second brake 34 is selectively engageable to connect the second shaft or interconnecting member 44 with the stationary element or the transmission housing 50 in order to restrict the member 44 from rotating relative to the transmission housing 50.

Figure 3:
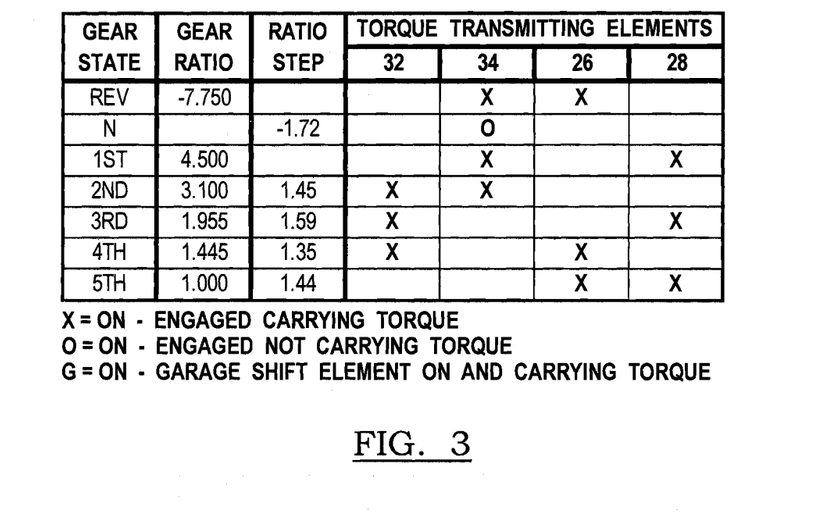
FIG. 3 is a truth table presenting the state of engagement of the various torque transmitting elements in each of the available forward and reverse speeds or gear ratios of the transmission illustrated in FIGS. 1 and 2.

Referring now to FIG. 2 and FIG. 3, the operation of the embodiment of the five speed transmission 10 will be described. It will be appreciated that transmission 10 is capable of transmitting torque from the input shaft or member 12 to the output shaft or member 22 in at least five forward speed or torque ratios and at least one reverse speed or torque ratio. Each forward and reverse speed or torque ratio is attained by engagement of one or more of the torque-transmitting mechanisms (i.e. first clutch 26, second clutch 28, first brake 32 and second brake 34), as will be explained below. FIG. 3 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish a reverse gear, first clutch 26 and second brake 34 are engaged or activated. The first clutch 26 connects the fourth shaft or interconnecting member 48 with the fifth shaft or interconnecting member 52. The second brake 34 connects the second shaft or interconnecting member 44 with the stationary element or the transmission housing 50 in order to restrict the member 44 from rotating relative to the transmission housing 50. Likewise, the five forward ratios are achieved through different combinations of clutch and brake engagement, as shown in FIG. 3.

It will be appreciated that the foregoing explanation of operation and gear states of the five speed transmission 10 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 4:
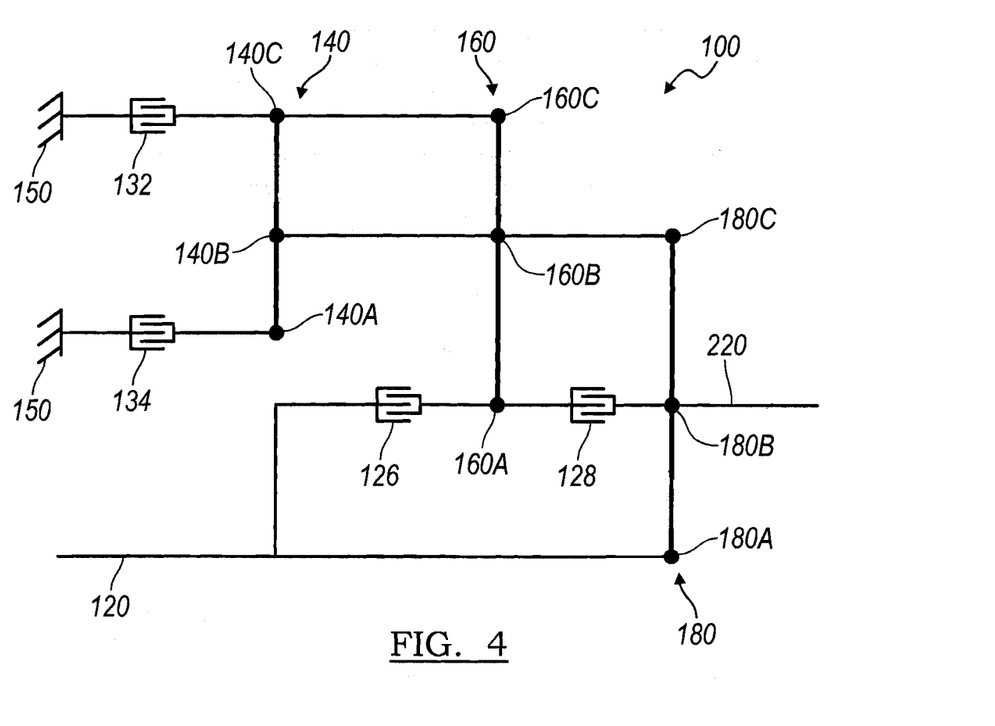
FIG. 4 is a lever diagram of another embodiment of a five speed transmission according to the present invention.

In another embodiment of the present invention, a transmission 100 is provided and illustrated in lever diagram form in FIG. 4. Transmission 100 includes an input shaft or member 120, a first planetary gear set 140, a second planetary gear set 160 and a third planetary gear set 180 and an output shaft or member 220. In the lever diagram of FIG. 4, the first planetary gear set 140 has three nodes: a first node 140A, a second node 140B and a third node 140C. The second planetary gear set 160 has three nodes: a first node 160A, a second node 160B and a third node 160C. The third planetary gear set 180 has three nodes: a first node 180A, a second node 180B and a third node 180C.

The input member 120 is continuously coupled to the first node 180A of the third planetary gear set 180. The output member 220 is coupled to the second node 180B of the third planetary gear set 180. The second node 140B of the first planetary gear set 140 is coupled to the second node 160B the second planetary gear set 160. The third node 140C of the first planetary gear set 140 is coupled to third node 160C the second planetary gear set 160C. The second node 160B of the second planetary gear set 160 is coupled to the third node 180C of the third planetary gear set 180.

A first clutch 126 selectively connects the first node 180A of the third planetary gear set 180 and the input member or shaft 120 with the first node 160A of the second planetary gear set 160. A second clutch 128 selectively connects the second node 180B of the third planetary gear set 180 and the output member or shaft 220 with the first node 160A of the second planetary gear set 160. A first brake 132 selectively connects the third node 140C of the first planetary gear set 140 with a stationary member or transmission housing 150. A second brake 134 selectively connects the first node 140A of the first planetary gear set 140 with a stationary member or transmission housing 150.

Figure 5:
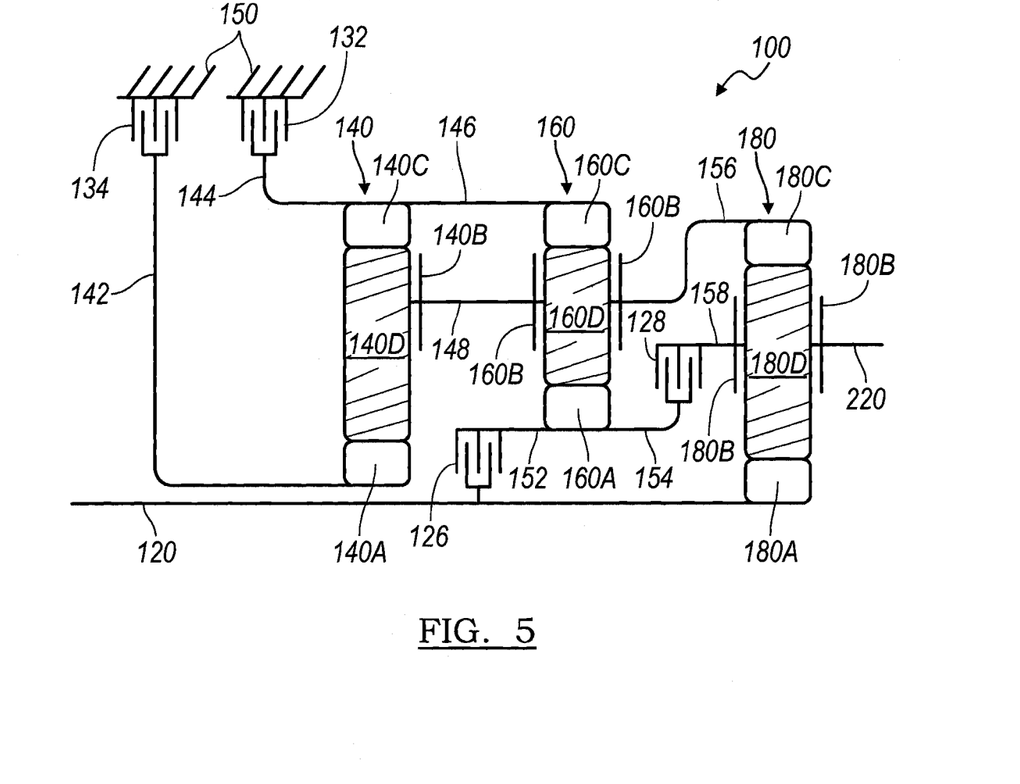
FIG. 5 is a diagrammatic illustration of another embodiment of a five speed transmission according to the present invention.

Referring now to FIG. 5, a stick diagram presents a schematic layout of the embodiment of the five speed transmission 100 according to the present invention. In FIG. 5, the numbering from the lever diagram of FIG. 4 is carried over. The clutches and couplings are correspondingly presented whereas the nodes of the planetary gear sets now appear as components of planetary gear sets such as sun gears, ring gears, planet gears and planet gear carriers.

For example, the planetary gear set 140 includes a sun gear member 140A, a ring gear member 140C and a planet gear carrier member 140B that rotatably supports a set of planet gears 140D (only one of which is shown). The sun gear member 140A is connected to a stationary member or transmission housing 150 through a first shaft or interconnecting member 142. The ring gear member 140C is connected to a second shaft or interconnecting member 144 and a third shaft or interconnecting member 146. The planet carrier member 140B is connected for common rotation with a fourth shaft or interconnecting member 148. The planet gears 140D are each configured to intermesh with both the sun gear member 140A and the ring gear member 140C.

The planetary gear set 160 includes a sun gear member 160A, a ring gear member 160C and a planet gear carrier member 160B that rotatably supports a set of planet gears 160D (only one of which is shown). The sun gear member 160A is connected for common rotation with a fifth shaft or interconnecting member 152 and a sixth shaft or interconnecting member 154. The ring gear member 160C is connected for common rotation with the third shaft or interconnecting member 146. The planet carrier member 160B is connected for common rotation with the fourth shaft or interconnecting member 148 and a seventh shaft or interconnecting member 156. The planet gears 160D are each configured to intermesh with both the sun gear member 160A and the ring gear member 160C.

The planetary gear set 180 includes a sun gear member 180A, a ring gear member 180C and a planet gear carrier member 180B that rotatably supports a set of planet gears 180D (only one of which is shown). The sun gear member 180A is connected for common rotation with the input shaft or member 120. The ring gear member 180C is connected for common rotation with the seventh shaft or interconnecting member 156. The planet carrier member 180B is connected for common rotation with an eighth shaft or interconnecting member 158 and output shaft or member 220. The planet gears 180D are each configured to intermesh with both the sun gear member 180A and the ring gear member 180C.

The input shaft or member 120 is continuously connected to an engine (not shown) or to a turbine of a torque converter (not shown) or input clutch (not shown). The output shaft or member 220 is continuously connected with the final drive unit or transfer case (not shown).

The torque-transmitting mechanisms or clutches 126, 128 and first brake 132 and second brake 134 allow for selective interconnection of the shafts or interconnecting members, members of the planetary gear sets and the housing. For example, the first clutch 126 is selectively engageable to connect the input shaft or member 120 with the fifth shaft or interconnecting member 152. The second clutch 128 is selectively engageable to connect the sixth shaft or interconnecting member 154 with the eighth shaft or interconnecting member 158. The first brake 132 is selectively engageable to connect the second shaft or interconnecting member 144 with the stationary element or the transmission housing 150 in order to restrict the member 144 from rotating relative to the transmission housing 150. The second brake 134 is selectively engageable to connect the first shaft or interconnecting member 142 with the stationary element or the transmission housing 150 in order to restrict the member 142 from rotating relative to the transmission housing 150.

Figure 6:
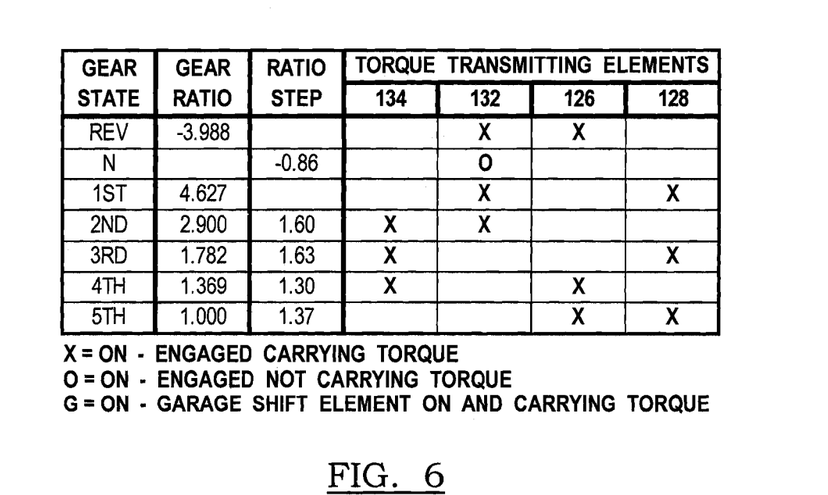
FIG. 6 is a truth table presenting the state of engagement of the various torque transmitting elements in each of the available forward and reverse speeds or gear ratios of the transmission illustrated in FIGS. 4 and 5.

Referring now to FIG. 4 and FIG. 5, the operation of the embodiment of the five speed transmission 100 will be described. It will be appreciated that transmission 100 is capable of transmitting torque from the input shaft or member 120 to the output shaft or member 220 in at least five forward speed or torque ratios and at least one reverse speed or torque ratio. Each forward and reverse speed or torque ratio is attained by engagement of one or more of the torque-transmitting mechanisms (i.e. first clutch 126, second clutch 128, first brake 132 and second brake 134), as will be explained below. FIG. 6 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 6. Of course, other gear ratios are achievable depending on the gear diameter, gear teeth count and gear configuration selected.

To establish a reverse gear, first clutch 126 and first brake 132 are engaged or activated. The first clutch 126 connects the input shaft or member 120 with the fifth shaft or interconnecting member 152. The first brake 132 connects the second shaft or interconnecting member 144 with the stationary element or the transmission housing 150 in order to restrict the member 144 from rotating relative to the transmission housing 150. Likewise, the five forward ratios are achieved through different combinations of clutch and brake engagement, as shown in FIG. 6.

It will be appreciated that the foregoing explanation of operation and gear states of the five speed transmission 100 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Figure 7:
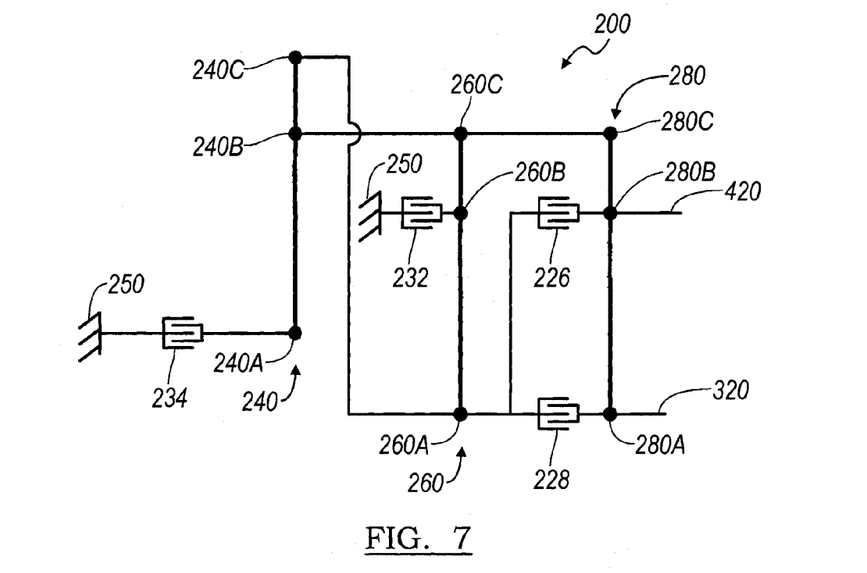
FIG. 7 is a lever diagram of yet another embodiment of a five speed transmission according to the present invention.

In yet another embodiment of the present invention, a transmission 200 is provided and illustrated in lever diagram form in FIG. 7. Transmission 200 includes an input shaft or member 320, a first planetary gear set 240, a second planetary gear set 260 and a third planetary gear set 280 and an output shaft or member 420. In the lever diagram of FIG. 7, the first planetary gear set 240 has three nodes: a first node 240A, a second node 240B and a third node 240C. The second planetary gear set 260 has three nodes: a first node 260A, a second node 260B and a third node 260C. The third planetary gear set 280 has three nodes: a first node 280A, a second node 280B and a third node 280C.

The input member 320 is continuously coupled to the first node 280A of the third planetary gear set 280. The output member 420 is coupled to the second node 280B of the third planetary gear set 280. The second node 240B of the first planetary gear set 240 is coupled to the third node 260C the second planetary gear set 260. The third node 240C of the first planetary gear set 240 is coupled to first node 260A the second planetary gear set 260C. The third node 260C of the second planetary gear set 260 is coupled to the third node 280C of the third planetary gear set 280.

A first clutch 226 selectively connects the first node 260A of the second planetary gear set 260 with the second node 280B of the second planetary gear set 280 and the output member or shaft 420. A second clutch 228 selectively connects the first node 260A of the second planetary gear set 260 with the first node 280A of the third planetary gear set 280 and the input member or shaft 320. A first brake 232 selectively connects the second node 260B of the second planetary gear set 260 with a stationary member or transmission housing 250. A second brake 234 selectively connects the first node 240A of the first planetary gear set 240 with a stationary member or transmission housing 250.

Figure 8:
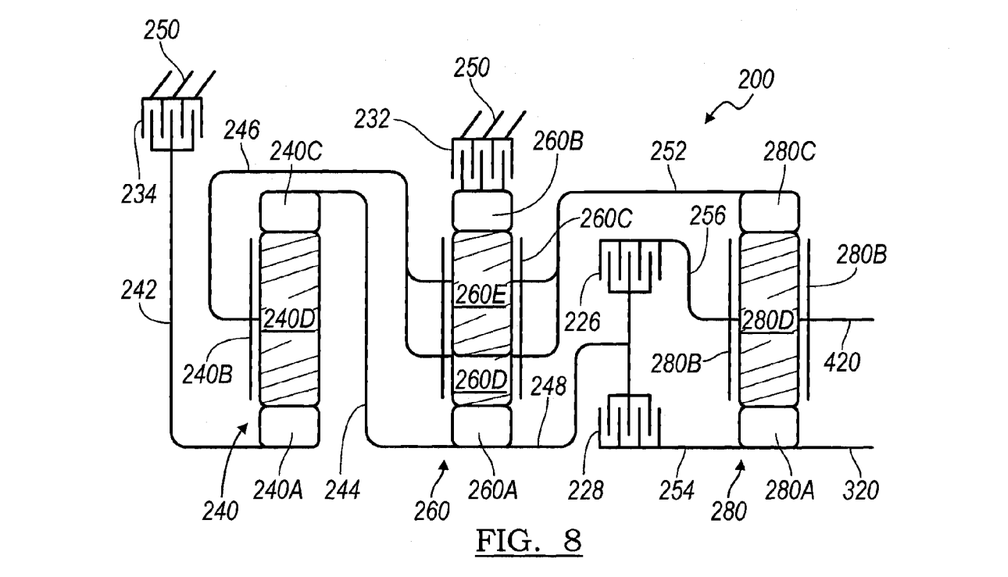
FIG. 8 is a diagrammatic illustration of yet another embodiment of a five speed transmission according to the present invention.

Referring now to FIG. 8, a stick diagram presents a schematic layout of the embodiment of the five speed transmission 200 according to the present invention. In FIG. 8, the numbering from the lever diagram of FIG. 7 is carried over. The clutches and couplings are correspondingly presented whereas the nodes of the planetary gear sets now appear as components of planetary gear sets such as sun gears, ring gears, planet gears and planet gear carriers.

For example, the planetary gear set 240 includes a sun gear member 240A, a ring gear member 240C and a planet gear carrier member 240B that rotatably supports a set of planet gears 240D (only one of which is shown). The sun gear member 240A is connected to a stationary member or transmission housing 250 through a first shaft or interconnecting member 242. The ring gear member 240C is connected to a second shaft or interconnecting member 244. The planet carrier member 240B is connected for common rotation with a third shaft or interconnecting member 246. The planet gears 240D are each configured to intermesh with both the sun gear member 240A and the ring gear member 240C.

The planetary gear set 260 includes a sun gear member 260A, a ring gear member 260B and a planet gear carrier member 260C that rotatably supports a first set of planet gears 260D (only one of which is shown) and a second set of planet gears 260E (only one of which is shown). The sun gear member 260A is connected for common rotation with the second shaft or interconnecting member 244 and a fourth shaft or interconnecting member 248. The ring gear member 260B is connected to first brake 232 for selectively connecting member 260B to the transmission housing 250. The planet carrier member 260C is connected for common rotation with the third shaft or interconnecting member 246 and a fifth shaft or interconnecting member 252. The first set of planet gears 260D are each configured to intermesh with both the sun gear member 260A and the second set of planet gears 260E. The second set of planet gears 260E are each configured to intermesh with both ring gear member 260B and the first set of planet gears 260D.

The planetary gear set 280 includes a sun gear member 280A, a ring gear member 280C and a planet gear carrier member 280B that rotatably supports a set of planet gears 280D (only one of which is shown). The sun gear member 280A is connected for common rotation with the input shaft or member 320 and with a sixth shaft or interconnecting member 254. The ring gear member 280C is connected for common rotation with the fifth shaft or interconnecting member 252. The planet carrier member 280B is connected for common rotation with a seventh shaft or interconnecting member 256 and output shaft or member 420. The planet gears 280D are each configured to intermesh with both the sun gear member 280A and the ring gear member 280C.

The input shaft or member 320 is continuously connected to an engine (not shown) or to a turbine of a torque converter (not shown) or input clutch (not shown). The output shaft or member 420 is continuously connected with the final drive unit or transfer case (not shown).

The torque-transmitting mechanisms or clutches 226, 228 and first brake 232 and second brake 234 allow for selective interconnection of the shafts or interconnecting members, members of the planetary gear sets and the housing. For example, the first clutch 226 is selectively engageable to connect the input shaft or member 248 with the fifth shaft or interconnecting member 256. The second clutch 228 is selectively engageable to connect the fourth shaft or interconnecting member 248 with the sixth shaft or interconnecting member 254. The first brake 232 is selectively engageable to connect the ring member 260B with the stationary element or the transmission housing 250 in order to restrict the member 260B from rotating relative to the transmission housing 250. The second brake 234 is selectively engageable to connect the first shaft or interconnecting member 242 with the stationary element or the transmission housing 250 in order to restrict the member 242 from rotating relative to the transmission housing 250.

Figure 9:
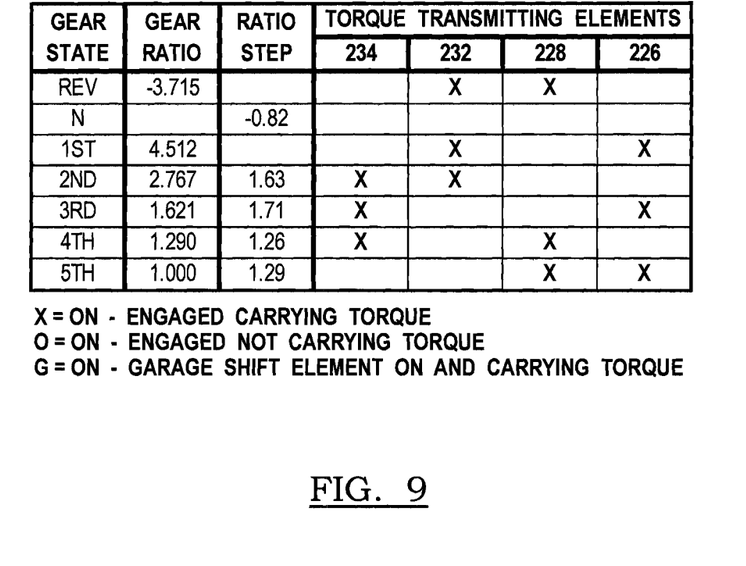
FIG. 9 is a truth table presenting the state of engagement of the various torque transmitting elements in each of the available forward and reverse speeds or gear ratios of the transmission illustrated in FIGS. 7 and 8.

Referring now to FIG. 7 and FIG. 8, the operation of the embodiment of the five speed transmission 200 will be described. It will be appreciated that transmission 200 is capable of transmitting torque from the input shaft or member 320 to the output shaft or member 420 in at least five forward speed or torque ratios and at least one reverse speed or torque ratio. Each forward and reverse speed or torque ratio is attained by engagement of one or more of the torque-transmitting mechanisms (i.e. first clutch 226, second clutch 228, first brake 232 and second brake 234), as will be explained below. FIG. 9 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. A "G" represents that a garage shift element has to switch on and carrying torque when the transmission mode selector or shifter (Park, Reverse, Neutral, Drive or Low gear selector) is moved from reverse to drive and switch off when shifting back to reverse. Actual numerical gear ratios of the various gear states are also presented although it should be appreciated that these numerical values are exemplary only and that they may be adjusted over significant ranges to accommodate various applications and operational criteria of the transmission 200. An example of the gear ratios that may be obtained using the embodiments of the present invention are also shown in FIG. 9. Of course, other gear ratios are achievable depending on the gear diameter, gear teeth count and gear configuration selected.

To establish a reverse gear, second clutch 228 and first brake 232 are engaged or activated. The second clutch 228 connects the fourth shaft or interconnecting member 248 with the sixth shaft or interconnecting member 254. The first brake 232 connects the ring member 260B with the stationary element or the transmission housing 250 in order to restrict the member 260B from rotating relative to the transmission housing 250. Likewise, the five forward ratios are achieved through different combinations of clutch and brake engagement, as shown in FIG. 9.

It will be appreciated that the foregoing explanation of operation and gear states of the five speed transmission 200 assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
first, second and third planetary gear sets each having first, second and third members;
a first interconnecting member continuously interconnecting the second member of the first planetary gear set with the first member of the second planetary gear set;
a second interconnecting member continuously interconnecting the third member of the first planetary gear set with the second member of the second planetary gear set;
a third interconnecting member continuously interconnecting the first member of the second planetary gear set with the first member of the third planetary gear set;
a fourth interconnecting member continuously connected to the third member of the second planetary gear set;
a fifth interconnecting member continuously connected to the third member of the third planetary gear set; and
four torque transmitting mechanisms each selectively engageable to interconnect at least one of the first, second, and third members with at least one other of the first, second, third members and a stationary member,
wherein the torque transmitting mechanisms are selectively engageable in combinations of at least two to establish at least five forward speed ratios and at least one reverse speed ratio between the input member and the output member, and
wherein a first of the four torque transmitting mechanisms is selectively engageable to interconnect the fourth interconnecting member with the fifth interconnecting member.

2. The transmission of claim 1 wherein a second of the four torque transmitting mechanisms is selectively engageable to interconnect the third member of the second planetary gear set with the second member of the third planetary gear set.

3. The transmission of claim 2 wherein a third of the four torque transmitting mechanisms is selectively engageable to interconnect the first member of the first planetary gear set with the stationary member.

4. The transmission of claim 3 wherein a fourth of the four torque transmitting mechanisms is selectively engageable to interconnect the third member of the first planetary gear set and the second member of the second planetary gear set with the stationary member.

5. The transmission of claim 1 wherein the input member is continuously connected for common rotation with the third member of the third planetary gear set.

6. The transmission of claim 1 wherein the output member is continuously connected for common rotation with the second member of the third planetary gear set.

7. A transmission comprising:
an input member;
an output member;
first, second and third planetary gear sets each having first, second and third members;
a first interconnecting member continuously interconnecting the second member of the first planetary gear set with the first member of the second planetary gear set;
a second interconnecting member continuously interconnecting the third member of the first planetary gear set with the second member of the second planetary gear set;
a third interconnecting member continuously interconnecting the first member of the second planetary gear set with the first member of the third planetary gear set; and
four torque transmitting mechanisms each selectively engageable to interconnect at least one of the first, second, and third members with at least one other of the first, second, third members and a stationary member,
wherein the torque transmitting mechanisms are selectively engageable in combinations of at least two to establish at least five forward speed ratios and at least one reverse speed ratio between the input member and the output member, and
wherein the first member of the first planetary gear set, the third member of the second planetary gear set and the third member of the third planetary gear set are sun gears, the second members of the first, second and third planetary gear sets are carrier members and the third member of the first planetary gear set, the first member of the second planetary gear set and the first member of the third planetary gear set are ring gears.

8. A transmission comprising:
first, second and third planetary gear sets each having a sun gear, a carrier member and a ring gear;
an input member continuously connected for common rotation with the sun gear of the third planetary gear set;
an output member continuously connected for common rotation with the carrier member of the third planetary gear set;
a first interconnecting member continuously interconnecting the carrier member of the first planetary gear set with the ring gear of the second planetary gear set;
a second interconnecting member continuously interconnecting the ring gear of the first planetary gear set with the carrier member of the second planetary gear set;
a third interconnecting member continuously interconnecting the ring gear of the second planetary gear set with the ring gear of the third planetary gear set;
a first torque transmitting mechanism selectively engageable to interconnect the sun gear of the second planetary gear set with the sun gear of the third planetary gear set
a second torque transmitting mechanism selectively engageable to interconnect the sun gear of the second planetary gear set with the carrier member of the third planetary gear set;
a third torque transmitting mechanism selectively engageable to interconnect the sun gear of the first planetary gear set with the stationary member; and
a fourth torque transmitting mechanism selectively engageable to interconnect the ring gear of the first planetary gear set and the second member of the second planetary gear set with the stationary member, and
wherein the torque transmitting mechanisms are selectively engageable in combinations of at least two to establish at least five forward speed ratios and at least one reverse speed ratio between the input member and the output member.

* * * * *